June 10, 1930.  E. EGER  1,762,164
TESTING MACHINE
Filed July 9, 1927
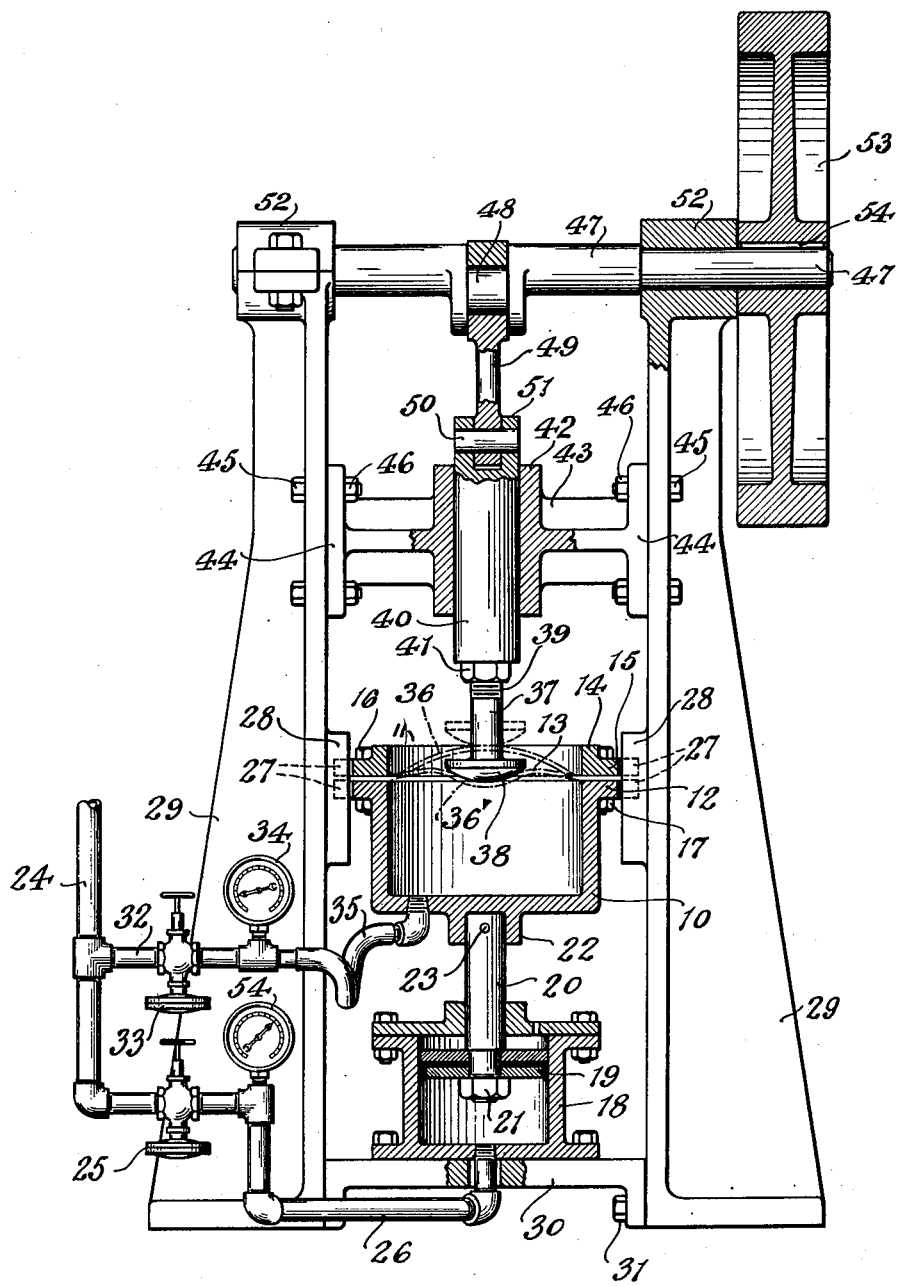

Patented June 10, 1930

1,762,164

UNITED STATES PATENT OFFICE

ERNST EGER, OF DETROIT, MICHIGAN, ASSIGNOR TO MORGAN AND WRIGHT, OF DETROIT, MICHIGAN, A CORPORATION OF MICHIGAN

TESTING MACHINE

Application filed July 9, 1927. Serial No. 204,458.

This invention relates to machines for testing fabric or tire material of the kind used in tire treads (solid or pneumatic) and particularly to a machine for determining the elastic limit, the separation of plies, or the tendency of the material to crack when it enters into the production of tires or other articles.

Heretofore it has been necessary to conduct the test of this material under actual road or service conditions which was an expensive operation and required a considerable length of time to complete a dependable test.

It is one of the objects of the present invention to subject the test material to the same conditions as would prevail upon a natural road test and to accelerate the testing operation so that in a comparatively short period of time the material will be tested to a degree, approaching that of the finished product under actual service conditions. For this purpose, a sample of test material is secured in a suitable holder and means are provided for flexing the material in one direction while other means are provided for intermittently flexing the material in the opposite direction, whereby the material is given a succession of vibrations in both directions which corresponds to the identations and expansions it would actually be subjected to if running upon a road. The clamp is yieldingly supported so that it may move bodily with the test material in a direction away from the intermittent flexing means during the progress of the test. This yielding corresponds to the function of the springs of a vehicle supported by the tires.

The accompanying drawing is a vertical view of the testing machine with parts broken away in section to show the interior mechanism.

In the drawing, which illustrates one embodiment of the invention, the reference character 10 indicates a pressure chamber having an open mouth 11 and a flange portion 12 over which a sample of test material 13 is laid. The test material may be a single piece or made up of a number of plies usually held together by a suitable binder. A clamping ring 14 having a flange portion 15 overlying the flange 12 is brought to position upon the outer margin of the test material 13 and is secured to the flange 12 by means of bolts 16 passing through both of said flanges and drawn tight by nuts 17. Located beneath the chamber 10 there is a cylinder 18 having a piston 19 to which is secured a piston rod 20 by means of a nut 21. The upper end of the piston rod 20 is received in a hollow boss 22 at the bottom of the chamber 10 and may be secured therein by a pin 23.

A pipe main 24, preferably containing air under pressure, connects through a reduction valve 25 and then through a pipe 26 to the bottom of the cylinder 18. Pressure applied to the piston 19 causes the same to rise and thereby lift or floatingly support the chamber 10. The chamber 10 and the clamping ring 14 have ears 27 at opposite sides which are slidable in vertical guides 28 carried by a pair of upright frames 29 connected adjacent their lower ends by a cross plate 30 held to the frames 29 by fasteners 31. A branch 32 of the pressure supply pipe 24 connects through a reduction valve 33 and a pressure gauge 34, then through a flexible pipe 35 to the bottom of the chamber 10 to admit fluid under pressure to said chamber 10 and thereby cause the test material 13 to be expanded or bellied, as indicated by the dot and dash lines 36.

Means are provided for delivering to the expanded or bellied material 13 a succession of flexing operations in a direction opposed to that caused by the pressure beneath the test material. For this purpose there is provided an adjustable plunger 37 including a rounded or otherwise shaped head 38 which is located adjacent the middle of the test material and immediately thereabove. The plunger 37 includes a shank 39 threaded into a vertically movable member 40, a lock nut 41 being provided to clamp the plunger in any of its adjusted positions. The vertical movable member 40 slides in a guide 42 carried by a cross brace 43 having flanges 44 secured to the uprights 29 by means of bolts 45 and nuts 46.

Reciprocating motion is imparted to the vertically movable member 40 by means of a crank shank 47 having a crank pin 48 which drives a connecting rod 49 connected by means of a cross pin 50 to the upper forked end 51 of the member 40. The crank shaft 47 is journalled in bearings 52 at the top of the frames 29 and a fly wheel 53 may be secured by means of a key 54 to the crank shaft 47 so as to provide an unvarying rotation of the crank shaft and a consequent uniformity of action of the plunger 37 against the test material 13. Any suitable means however may be employed to rotate the crank shaft 47.

When pressure is admitted through reduction valve 25 to the cylinder 18, the piston 19 causes the chamber 10, the clamp and test piece 13 to be elevated to position for receiving the flexing action of the plunger 37, the pressure in the chamber 18 being indicated on a pressure gauge 54 and may be varied so as to meet the particular conditions required for the material being tested. The pressure in the chamber 10 can also be regulated and is indicated on its gauge 34. By regulating the pressures in the chamber 10 and the cylinder 18, characteristics corresponding to road conditions to which the material is to be subjected may be accurately obtained.

Under the reciprocating action of the plunger 37, the test material 13 will be rapidly flexed upward as indicated at 36 and then downward as shown at 36', and the piston 19 will permit the chamber 10 and its test material 13 to yield bodily downward under the action of the plunger 37. This action corresponds to what would occur in a vehicle equipped with tires, the piston 19 and the chamber 18 representing the springs of the vehicle. The yielding action of the chamber 10 may vary during the test as the elastic limit of the material 13 is approached or reached, and any tendency of plies to separate or the material to crack may be readily identified upon inspection of the removed sample.

Having thus described my invention what I claim and desire to protect by Letters Patent is:

1. A machine for testing material, comprising mechanism for flexing said test material alternately in opposite directions, said mechanism being arranged to apply fluid under pressure against said material as a means for flexing the same.

2. A machine for testing material, comprising a support for said material, means for applying fluid under pressure to one side of the material, and means for intermittently flexing said material in opposition to the pressure fluid, said support for said material being adapted to permit bodily yielding of said material under the action of said intermittent flexing means.

3. A machine for testing material, comprising a support for said material, means of applying fluid under pressure to one side of the material, and means for intermittently flexing said material in opposition to the pressure fluid, said support for said material being adapted to permit bodily yielding of said material under the action of said intermittent flexing means, said fluid pressure, said flexing means and said support each having independent means of adjustment.

4. A machine for testing fabric or tire material including in combination, means for holding the material to be tested, means for applying pressure to one side of said material, so as to cause a flexing of the same, and means for intermittently flexing said material in a direction opposed to the expanding action of said intermittent flexing means.

5. A machine for testing fabric or tire material including in combination, means for holding the material to be tested, means for applying pressure to one side of said material, so as to cause a flexing of the same, and means for intermittently flexing said material in a direction opposed to the expanding action of the pressure applying means, the material holding means being yieldable whereby to permit the same and the test material to move bodily under the action of said intermittant flexing means.

6. A machine for testing fabric or tire material including in combination, means for holding the material to be tested, means for applying pressure to one side of said material, so as to cause a flexing of the same, means for intermittently flexing said material in a direction opposed to the expanding action of the pressure applying means, the material holding means being yieldable whereby to permit the same and the test material to move bodily under the action of said flexing means, and means for varying the degree of yieldability of said material holding means.

7. A machine for testing fabric or tire material including in combination, means for holding the material to be tested, means for applying pressure to one side of said material so as to cause a flexing thereof, means for varying the degree of pressure applied, means for intermittently flexing said material in a direction opposed to the expanding action of the pressure applying means, and means for maintaining said material holding means in a manner to permit the same to yield under the action of said intermittent flexing means.

8. A machine for testing fabric or tire material including an open chamber over which the test material is laid a clamp for holding said material in position, means for applying pressure to the interior of said chamber whereby to expand the test material outward, and means for delivering to the outer side of said material a succession of flexing operations in opposition to the expanding action of the pressure means.

9. In a machine for testing fabric or tire material, in combination, a chamber having one side thereof open and provided with a peripheral flange, said flange providing a seat for the piece of material to be tested, a ring adapted to be secured to said flange whereby to grip the test material thereagainst, means for applying pressure to the interior of said chamber to expand the material outward from said opening, means for yieldingly supporting the chamber, a plunger arranged to rest upon the outer surface of the expanded test material, and means for reciprocating said plunger so as to deliver a succession of flexing motions to the test material, said yielding means permitting the chamber and the test material to move during the flexing operation delivered by the plunger.

10. A machine for testing fabric or tire material including in combination, a chamber having an open mouth and a peripheral flange therearound, a ring having a flange corresponding to the chamber flange, the two flanges constituting a clamp between which a sample of test material is gripped, means for introducing pressure into said chamber in a manner to cause the test material to flex outward, a cylinder beneath said chamber, a piston in said cylinder, a piston rod connecting the piston to said chamber, means for delivering pressure beneath said piston whereby to floatingly support the chamber, a plunger adjacent the outside surface of said test material, a crank shaft, and a connecting rod joining the crank shaft to the plunger, the crank shaft being effective to reciprocate the plunger in a manner to flex said test material in a direction opposite to the expansive action of the pressure means, said pressure in the cylinder being effective to sustain the weight of the said chamber and also to yield under the action of said plunger.

11. In a machine for testing fabric or tire material, in combination, a chamber closed at the bottom and open at the top, a flange around said top, a ring having a flange, means for securing both in said flanges together with a sample of test material clamped therebetween, a pressure main, a branch pipe leading from said pressure main, a reduction valve and a pressure gauge in said branch pipe, a flexible tube connecting the latter to the chamber whereby to supply pressure thereto and expand the test material outward, a cylinder beneath the chamber, a piston in the cylinder, a piston rod connecting said piston to the chamber, a second branch pipe, a reduction valve and a gauge connected to the cylinder to supply pressure beneath the piston and thereby raise and yieldingly support the chamber, a pair of vertical guides, ears carried by the chamber and slidable in said guides, a plunger arranged at the top of the chamber and having a portion in contact with the expanded outer surface of the test material, a slide in which said plunger is adjustably carried, a crank shaft, a connecting rod between the crank shaft and the slide, and a fly wheel fixed to the crank shaft, said crank shaft effecting a reciprocating motion of the plunger to cause a flexing of said test material in opposition to the pressure applied from the interior of the chamber.

Signed at Detroit, county of Wayne, State of Michigan, this 1st day of July, 1927.

ERNST EGER.